(12) United States Patent
Jürgens et al.

(10) Patent No.: US 10,059,089 B2
(45) Date of Patent: Aug. 28, 2018

(54) METAL OR CERAMIC COMPONENT COMPRISING AT LEAST ONE MULTI-DIMENSIONALLY STRUCTURED CONNECTION PORTION AND METHOD FOR THE PRODUCTION THEREOF

(71) Applicant: AIRBUS DEFENCE AND SPACE GMBH, Ottobrunn (DE)

(72) Inventors: Michael Jürgens, Munich (DE); Tobias Mertens, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 208 days.

(21) Appl. No.: 15/141,085

(22) Filed: Apr. 28, 2016

(65) Prior Publication Data
US 2016/0318292 A1 Nov. 3, 2016

(30) Foreign Application Priority Data

Apr. 29, 2015 (EP) .................................... 15001270

(51) Int. Cl.
*B32B 37/12* (2006.01)
*B23K 26/00* (2014.01)
(Continued)

(52) U.S. Cl.
CPC .......... *B32B 37/12* (2013.01); *B23K 26/0006* (2013.01); *B23K 26/0078* (2013.01); *B23K 26/0084* (2013.01); *B29C 65/48* (2013.01); *B29C 65/564* (2013.01); *B29C 65/72* (2013.01); *B29C 66/1122* (2013.01); *B29C 66/30341* (2013.01); *B29C 66/43* (2013.01); *B29C 66/721* (2013.01); *B29C 66/82661* (2013.01); *B32B 7/12* (2013.01); *B32B 9/005* (2013.01); *B32B 15/04* (2013.01); *B32B 27/06* (2013.01);
(Continued)

(58) Field of Classification Search
CPC .................................. B32B 37/12; B32B 7/12
See application file for complete search history.

(56) References Cited

U.S. PATENT DOCUMENTS 8,518,521 B2 8/2013 Aso et al.
2012/0207974 A1* 8/2012 Maier ................ B23K 26/0084
428/141

(Continued)

FOREIGN PATENT DOCUMENTS

DE 10 2009 017776 A1 10/2010
JP 2009 061648 A 3/2009
WO WO 2011/069899 A2 6/2011

OTHER PUBLICATIONS

European Search Report for Application No. EP 15 00 1270 dated Oct. 29, 2015.

*Primary Examiner* — Daniel H. Lee
(74) *Attorney, Agent, or Firm* — Jenkins, Wilson, Taylor & Hunt, P.A.

(57) ABSTRACT

A metal or ceramic component includes at least one multi-dimensionally structured connection portion, wherein the connection portion is intended for forming an adhesive bond to fiber-reinforced polymer laminate, and wherein the metal or ceramic component has a milliscale structure, in particular formed by anchoring elements, and a microscale structure on the connection portion and the anchoring elements, over which microscale structure an additional nanoscale structure is formed.

13 Claims, 4 Drawing Sheets

(51) Int. Cl.
| | |
|---|---|
| *B29C 65/00* | (2006.01) |
| *B32B 7/12* | (2006.01) |
| *B32B 9/00* | (2006.01) |
| *B32B 15/04* | (2006.01) |
| *B32B 27/06* | (2006.01) |
| *B32B 38/00* | (2006.01) |
| *B29C 65/48* | (2006.01) |
| *B29C 65/56* | (2006.01) |
| *B29C 65/72* | (2006.01) |
| *B23K 103/04* | (2006.01) |
| *B23K 103/10* | (2006.01) |
| *B23K 103/14* | (2006.01) |
| *B23K 103/00* | (2006.01) |
| *B23K 103/08* | (2006.01) |
| *B29C 65/50* | (2006.01) |
| *B29C 65/02* | (2006.01) |

(52) U.S. Cl.
CPC ...... *B32B 38/0008* (2013.01); *B23K 2203/04* (2013.01); *B23K 2203/10* (2013.01); *B23K 2203/14* (2013.01); *B23K 2203/15* (2015.10); *B23K 2203/52* (2015.10); *B29C 65/02* (2013.01); *B29C 65/4835* (2013.01); *B29C 65/5057* (2013.01); *B29C 66/7212* (2013.01); *B32B 2605/18* (2013.01)

(56) References Cited

U.S. PATENT DOCUMENTS

2012/0207982 A1\* 8/2012 Aso ..................... B29C 45/0005
428/164
2013/0149501 A1 6/2013 Pacchione et al.

\* cited by examiner

METAL OR CERAMIC COMPONENT COMPRISING AT LEAST ONE MULTI-DIMENSIONALLY STRUCTURED CONNECTION PORTION AND METHOD FOR THE PRODUCTION THEREOF

CROSS-REFERENCE TO RELATED APPLICATION

This application claims priority to EP 15 001 270.6 filed Apr. 29, 2015, the entire disclosure of which is incorporated by reference herein.

TECHNICAL FIELD

The present disclosure relates to a metal or ceramic component comprising at least one multi-dimensionally structured connection portion, wherein the connection portion is intended for forming an adhesive bond to fiber-reinforced polymer laminate, and to a method for the production of the connection portion.

BACKGROUND

In particular in the aerospace industry, but also in the construction of watercraft and ground vehicles and in the construction of rotors of wind power plants and lightweight structures, fiber composite structures are now indispensable. The fiber-reinforced polymer laminate used in this case may contain carbon fibers, glass fibers, Kevlar, boron fibers or mixed fibers or woven fabric made of the above-mentioned fibers. In this case, the polymer matrix is either formed by "wet" epoxy resins, polyester resins, etc. or "prepregs" which contain resin and woven fabric fibers are used. This is particularly due to the virtually unlimited design possibilities and the enormous saving in weight compared with metal or ceramic materials. By appropriate alignment or material selection of the fiber rovings or fiber mats, i.e. for example a mix of carbon fibers and glass fibers or carbon fibers and Kevlar, in which one type of fiber is used in one direction and the other type of fiber in the other direction or one type of fiber is used inwardly and the other type of fiber outwardly, components constructed from fiber composite material can optimally absorb forces in the predefined manner, i.e. they are optimally adapted to the expected loads and can contribute alone to a considerable weight reduction. One weakness of fiber composite structures is, however, their low delamination resistance or the bond strength of bonds from precisely this material group. Sudden high initial loads can trigger the formation of interlaminar cracks, with relatively little energy being required for the cracks to advance as a result.

It is known in particular in aircraft and ship construction, but also in vehicle manufacture to reinforce carbon-fiber-reinforced plastics material or CFRP skin shells using CFRP stringers, CFRP formers, metal formers and similar structural components in order to withstand the high loads in the main shell region in a weight-optimised manner. Such components can for example be produced by prepreg technology, thermosetting processes or vacuum infusion processes for introducing a matrix, for example an epoxy resin, into reinforcing fibers and subsequently curing in a furnace or autoclave. A fiber composite component is for example composed of reinforcing fibers, whether they are rovings or woven fabric mats. Structural joints, which are intended to have a specific damage tolerance, can be provided with thin metal sheets between abutting surfaces, a transverse reinforcement being added to the fiber composite component by the material thickness of the metal sheet. Various composite technologies have been developed in order to improve the properties in the transverse direction, such as Z-pinning, stitching or tufting.

Furthermore, co-bonding methods are known, in which a fiber composite joining partner is cured in a vacuum in a first step and then, in a second step, the cured first joining partner is connected to a "fresh" joining partner in an integrated manner and cured. For example, in the field of aircraft construction this can be a cured longitudinal reinforcement (stringer) which is connected to the "wet" skin shells of the lower fuselage region of an aircraft structure.

Furthermore, there are also hybrid components which are constructed from a combination of metal or ceramic components with a polymer laminate and can be arranged at different points in the region of an aircraft or spacecraft or of a ground vehicle or watercraft.

WO2011/069899 A2 relates to a method for joining a fiber composite component to a structural component of an aircraft or spacecraft. In this case, a metal film is provided as a transverse reinforcing element between the fiber composite component and the structural component. The metal film is designed to have at least one anchoring element that protrudes at a 90° angle from the surface facing the fiber composite component and is inserted between the fiber composite component and the structural component and integrated therein. Furthermore, a corresponding arrangement is produced according to this method. In this way, it is already possible to achieve an improved delamination resistance of approximately 1.5 kJ/m$^2$ when a titanium film is used as a transverse reinforcing element.

SUMMARY

One of the ideas of the disclosure herein is to improve the adhesive bonds of fiber composite structures to metal or ceramic components in order to increase the delamination resistance or bond strength. This also applies in particular to the bonding of fiber composite structures to fiber composite structures by a metal or ceramic intermediate layer. Furthermore, possible contamination of the metal or ceramic component that has an adverse effect on the bond strength is to be prevented.

In this way, the adhesive bonding strength of fiber composite structures to metal or ceramic components is improved and the delamination resistance or bond strength is increased. By the disclosure herein, the delamination resistance can be increased by more than 30% with respect to a structure that is only milliscale. This also applies in particular to the bonding of fiber composite structures to fiber composite structures by a metal or ceramic intermediate layer. Furthermore, by the method according to the disclosure herein, possible contamination of the metal or ceramic component that has an adverse effect on the bond strength is prevented.

A method according to the disclosure herein for multi-dimensionally structuring at least one connection portion of a metal or ceramic component, wherein the connection portion is intended for forming an adhesive bond to fiber-reinforced polymer laminate, comprises:

1. producing a milliscale structure, i.e. a macrostructure having dimensions of greater than 1000 μm, by forming anchoring elements on the connection portion;

2. producing a microscale structure, i.e. a microstructure having dimensions of between 1 μm and 1000 μm, on the connection portion and the anchoring elements; and 3. producing a nanoscale structure, i.e. a nanostructure having dimensions of less than 1 µm, above the microscale structure on the connection portion and the anchoring elements.

In this case, the method steps may be carried out in this particular order. In this way, a microstructure, over which the nanostructure is formed, is produced on the milliscale connection portion having anchoring elements. In this case, the at least one anchoring element protrudes from the connection portion substantially perpendicularly or at a predetermined angle. The anchoring elements can also be designed as pins, barbs, teeth, spikes or helical structures, etc. Advantageously, the anchoring elements are formed integrally with the connection portion.

By the method according to the disclosure herein, a new surface topography is produced on the metal or ceramic component. These structures enable significantly improved mechanical anchoring to the surrounding polymer and/or the formation of a higher number of covalent bonds. The fiber composite laminates or compounds reinforced in this way consequently have a significantly higher delamination resistance than known fiber composite laminates and therefore lead to the fiber composite components in question having an increased service life.

Some developments of the method provide that, in the case of a metal component, the production of the milliscale structure by forming anchoring elements on the connection portion is carried out by stamping-and-bending processes, high-speed metal machining, electron beam machining, additive layer production processes, deposit welding, welding on of anchoring elements, or other suitable methods. For a ceramic component, the milliscale structure can for example be produced by molding before sintering.

Some developments of the method provide that the microscale structure on the connection portion and the anchoring elements is produced by sandblasting or electromagnetic radiation, in particular laser irradiation. Impurities in the structure can also be eliminated in this way. An improved contacting and adhering surface can thus be achieved.

Some developments of the method provide that a nanoscale structure is produced over the microscale structure on the connection portion and the anchoring elements by laser irradiation or anodization. In particular, forming the nanoscale structure over the microscale structure promotes an optimum joining surface of the composite structure.

Some developments of the method provide that the laser irradiation is carried out by a short-pulse laser, in particular a femtosecond, picosecond or nanosecond laser having a high pulse repetition frequency that is moved at a defined feed rate relative to the connection portion. In this case, the feed rate and the feed path are defined by the type of processing—microscaling or nanoscaling.

Some developments of the method provide that the laser for producing the microscale structure and the laser for producing the nanoscale structure are arranged one behind the other in such a way that the microstructure over which the nanostructure is formed is produced in one feed flow path. As a result, the production process can be optimised and accelerated.

The metal or ceramic component according to the disclosure herein comprising at least one multi-dimensionally structured connection portion provides a connection portion in order to form an adhesive bond to fiber-reinforced polymer laminate, which connection portion has a milliscale structure, in particular formed by anchoring elements, and a microscale structure on the connection portion and the anchoring elements, over which microscale structure an additional nanoscale structure is formed. This allows the metal or ceramic component to be reinforced effectively and mechanically anchored to a polymer fiber composite structure, and allows a higher number of covalent bonds to form.

The metals used can be titanium alloys, aluminium alloys, stainless steel alloys, magnesium or the like. For the ceramic components, materials can be used that are electrically and thermally insulating and can nevertheless be mechanically and thermally processed, such as MACOR, boron nitride, silicon carbide or aluminium oxide.

Some embodiments of the metal or ceramic component according to the disclosure herein provide that connection portions are provided on all sides. For planar metal or ceramic components, the connection elements thus protrude in the z-direction.

Some embodiments of the metal or ceramic component according to the disclosure herein provide that the component is produced from an alloy of titanium, aluminium, steel, for example stainless steel, or magnesium, or another metal alloy.

Furthermore, the disclosure herein provides the use of a metal or ceramic component according to the disclosure herein as a z-reinforcement of fiber-reinforced polymer laminates. In this case, the metal or ceramic component can be completely surrounded by polymer laminate.

Furthermore, the metal or ceramic component produced according to the disclosure herein can be provided as a connection element in a co-bonding method. After the adhesive bond of the metal or ceramic component to the first joining partner is cured in a vacuum in an autoclave, in the next step adhesion to a second joining partner which is to be wet-glued is carried out.

BRIEF DESCRIPTION OF THE DRAWINGS

Additional features that improve the disclosure herein will be described in more detail below on the basis of examples and the accompanying drawings, in which.

DETAILED DESCRIPTION

Figure 1:
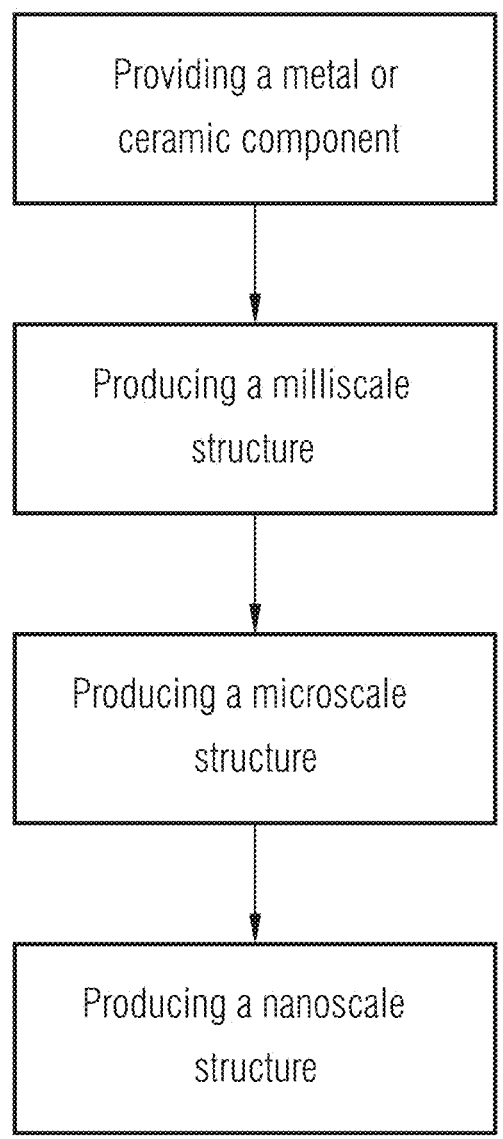
FIG. 1 is a flow diagram showing the method steps according to an embodiment of the disclosure herein.

FIG. 1 shows the method steps in the process sequence of the method. In this case, a metal or ceramic component is first provided which can be a thin metal sheet or a solid metal or ceramic body. A milliscale structure is then produced on the component. In this way, anchoring elements are provided on the entire metal or ceramic component or on portions thereof. In this case, the at least one anchoring element can protrude from the connection portion substantially perpendicularly or at a predetermined angle. The anchoring elements can also be designed as pins, barbs, teeth, spikes or helical structures etc. Advantageously, the anchoring elements are formed integrally with the connection portion.

In this case, the specific manner of producing the milliscale structure is significantly influenced by the material thickness and type of material of the metal or ceramic component. For a metal component, the connection portions can be produced by stamping-and-bending processes, high-speed metal machining, electron beam machining, additive layer production processes, deposit welding, welding on of anchoring elements, or other suitable methods. For a ceramic component, this step takes place for example by molding before sintering.

The next step for producing the microscale structure on the metal or ceramic component, including the millistructure formed thereon, is carried out for example by sandblasting or electromagnetic radiation, in particular laser irradiation.

Finally, as a further step, a nanoscale structure is produced over the microscale structure on the connection portion and the anchoring elements by laser irradiation or—in the case of a metal component—by anodization.

The method according to the disclosure herein will be described in more detail below on the basis of embodiments.

Example 1

By way of example, a first method for multi-dimensionally structuring at least one connection portion of a metal or ceramic component can proceed as follows:
1. Consecutive stamping and deformation of a titanium sheet, for example Ti15V3Al3Cr3Sn having a sheet thickness of t=0.4 mm, in order to produce a milliscale structure;
2. Sandblasting the titanium sheet, for example with Al2O3 or SiO2 having a particle size of from 250 μm-500 μm and at a jet pressure of 7 bar, in order to produce a microscale structure;
3. Laser irradiation, for example at a wavelength of 1064 nm, a pulse length of less than 20 ns, a speed of 800 mm/s, a current of 43 A, a frequency of 10 kHz and frequent repetition, in order to produce a nanoscale structure.

Example 2

By way of example, a second method for multi-dimensionally structuring at least one connection portion of a metal or ceramic component can proceed as follows:
1. Consecutive stamping and deformation of a titanium sheet, for example Ti15V3Al3Cr3Sn having a sheet thickness of t=0.4 mm, in order to produce a milliscale structure;
2. Laser microstructuring, for example at a wavelength of 1064 nm, a pulse length of less than 20 ns, a speed of 800 mm/s, a current of from 20-150 A, a frequency of 10 kHz and overlapping of more than 80%, in order to produce a microscale structure;
3. Laser irradiation, for example at a wavelength of 1064 nm, a speed of 800 mm/s, a current of 43 A, a frequency of 10 kHz and frequent repetition, in order to produce a nanoscale structure.

In this second example, the second and third step can be carried out in one working cycle, i.e. using at least two lasers that are arranged one behind the other in a common feed apparatus or in two separate feed apparatuses and are advanced together over the workpiece, the titanium sheet in this case.

Example 3

By way of example, a third method for multi-dimensionally structuring at least one connection portion of a metal or ceramic component can proceed as follows:
1. Consecutive stamping and deformation of a titanium sheet, for example Ti15V3Al3Cr3Sn having a sheet thickness of t=0.4 mm, in order to produce a milliscale structure;
2. Laser microstructuring, for example at a wavelength of 1064 nm, a speed of 800 mm/s, a current of from 20-150 A, a frequency of 10 kHz and overlapping of more than 80%, in order to produce a microscale structure;
3. Anodizing in an electrolyte, for example of sodium hydroxide at a concentration between 100-300 g/l sodium, sodium tartrate at a concentration of 20-200 g/l, a complexing agent e.g. MGDA at a concentration of 1-200 g/l and additional constituents, in order to produce a nanoscale structure.

Figure 2:
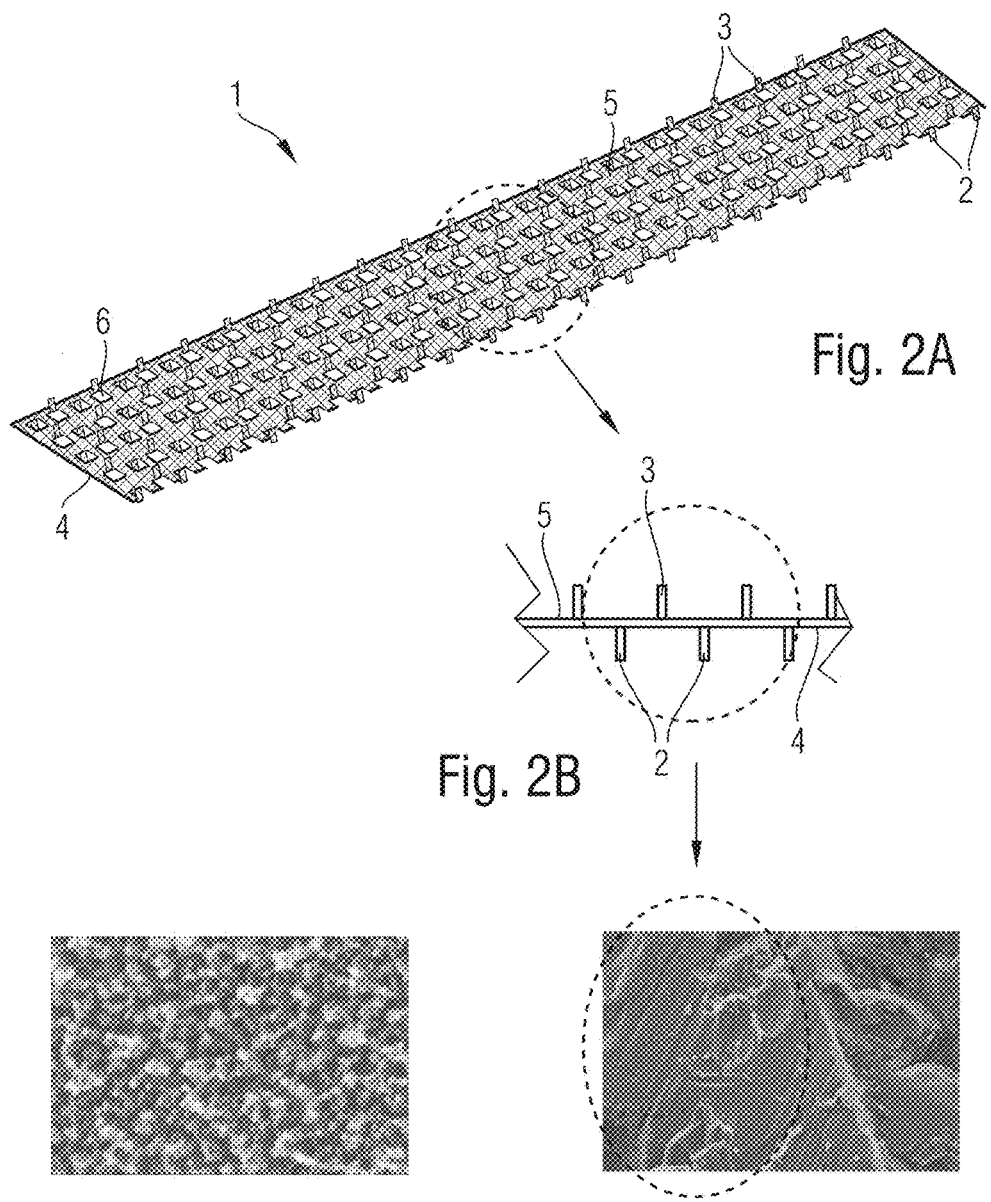
FIG. 2a-2d show a metal component having a multi-dimensionally structured connection portion.

FIG. 2a is a perspective view of an advantageous embodiment of a metal component 1 having a multi-dimensionally structured connection portion. In the present case, the connection portion is provided on the upper and lower side. The present embodiment is a consecutively stamped and deformed titanium sheet, for example Ti15V3Al3Cr3Sn having a sheet thickness of t=0.4 mm, on which a milliscale structure was first produced, i.e. a structure structured in the range of above 1 mm. Firstly, regularly distributed rectangles are stamped onto three side of the titanium sheet and then lower anchoring elements 2 are bent downwards, when viewed from the sheet plane or x-y plane, and upper anchoring elements 3 are bent upwards and out of the stamped regions perpendicularly to the plane of the titanium sheet, as shown in the side view in FIG. 2. In this way, rectangular notches 6 and anchoring elements protruding upwards and downwards in the z-axis direction are produced in the sheet. If only one side of the sheet is to be used as an anchor, corresponding anchoring elements 2, 3 can for example also be formed so as to protrude only downwards or only upwards in the z-axis direction, respectively.

Furthermore, the metal component 1 is microscaled, i.e. structured in a range above 1 μm, by sandblasting the lower side of the titanium sheet or the lower connection portion 4 and the upper side of the titanium sheet or the upper connection portion 5 and the upper and lower anchoring elements 2, 3 located thereon. In the present embodiment, Al2O3 having a particle size of from 250-500 μm and at a jet pressure of 7 bar is used to sandblast. The microscale surface structure produced thereby is shown in an enlarged manner in FIG. 2c. A similar result can be achieved by microscaling by laser irradiation.

A nanoscale structure, which was produced by an electrochemical process in the present embodiment, such as anodizing using an electrolyte, has been formed over the end of the microscale structure of the metal component 1. As a result, a surface structure in the range of less than 0.1 μm has been produced over the microscale structure. The microscale surface structure produced in this way is shown in an enlarged manner in FIG. 2d. A similar result can be achieved for example by microscaling by laser irradiation.

Figure 3:
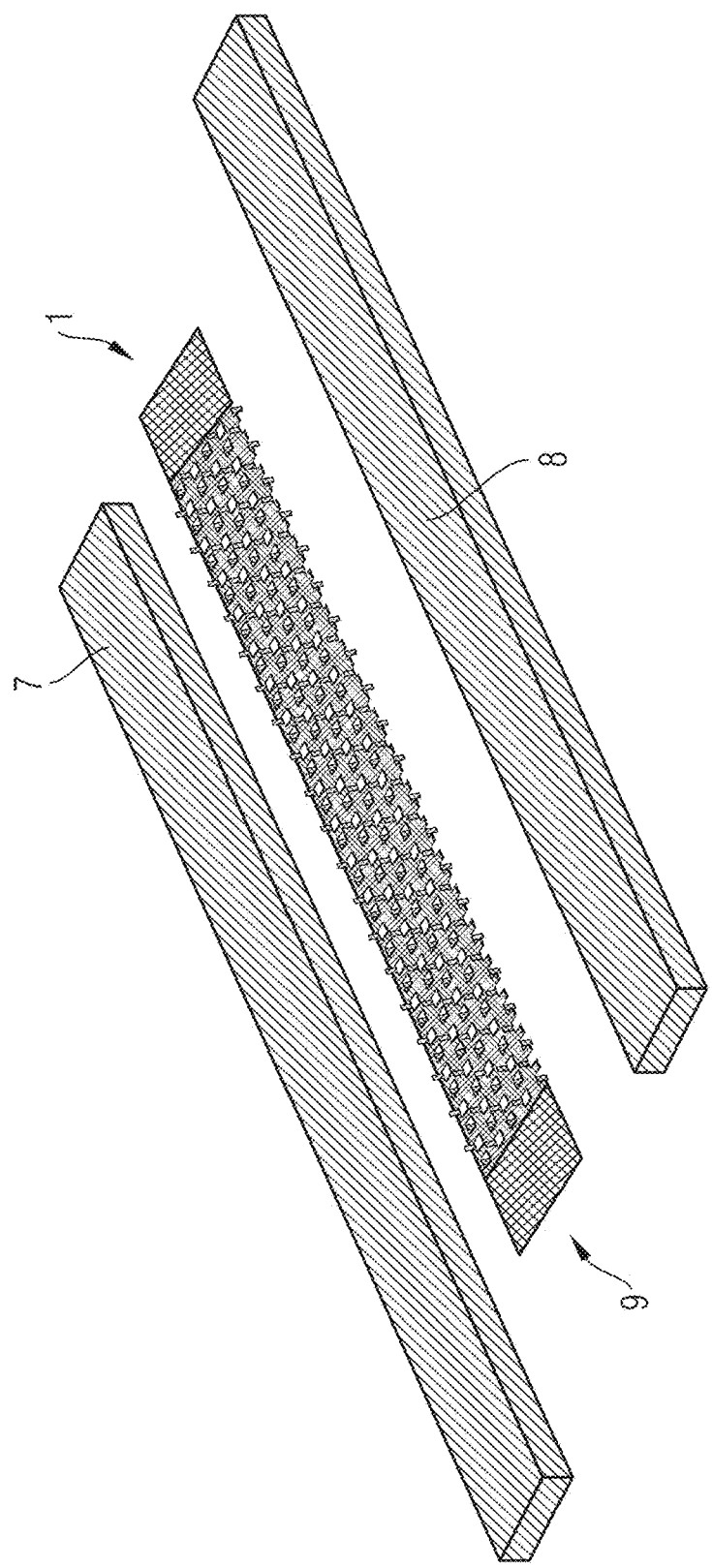
FIG. 3 is an exploded view of a fiber composite structure having a reinforcing plate.
Figure 4:
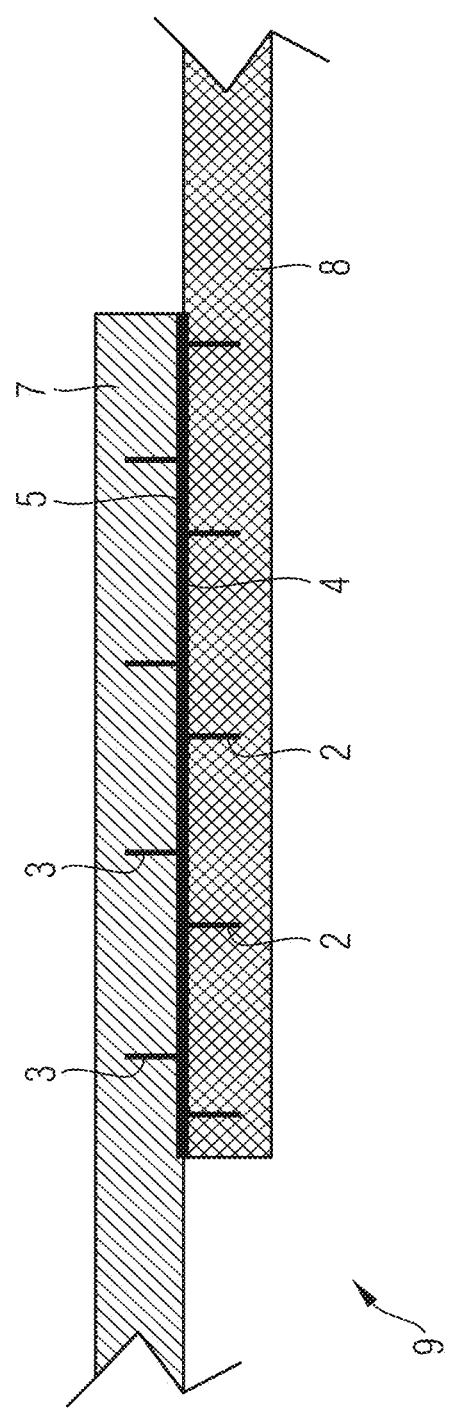
FIG. 4 is a side view of the fiber composite structure from FIG. 3 in the adhered state.

FIG. 3 is an exploded view of a fiber composite structure having a reinforcing plate. FIG. 4 is a side view of the fiber composite structure from FIG. 3 in the adhered state. In this case, an upper joining partner 7 is connected to the metal component according to the disclosure herein in such a way that the upper anchoring elements 3 engage in the fiber structure of the upper joining partner 7 in the z-axis direction and therefore make optimum adhesive anchoring possible. In the present embodiment, the fiber structure of the upper joining partner 7 is a carbon fiber structure that is connected to the metal component 1, used as reinforcing element, either in a wet adhesion method by epoxy resin or by a film adhesive. After appropriate curing in a vacuum in an autoclave, the joining to the lower joining partner 9 takes place, which joining partner is likewise a carbon fiber structure that is connected to the metal component 1, used as reinforcing element, either in a wet adhesion method by epoxy resin or by film adhesive to form a composite structure 9.

The multi-dimensionally structured metal component 1 enables considerably better z-reinforcement of fiber-reinforced polymer laminates than in conventional reinforcements. In this way, the delamination resistance is increased to 2 kJ/m$^2$.

The disclosure herein is not restricted to the above-mentioned preferred embodiments in terms of its implementation. Rather, a number of variants are conceivable which make use of the described solution, even if the designs thereof are fundamentally different.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for multi-dimensionally structuring at least one connection portion of a metal component, wherein the connection portion is intended for forming an adhesive bond to fiber-reinforced polymer laminate, and wherein the method comprises:
    producing a milliscale structure by forming anchoring elements on the connection portion which protrude from the connection portion substantially perpendicularly or at a predetermined angle by stamping-and-bending processes, high-speed metal machining, electron beam machining, additive layer production processes, deposit welding or welding on of anchoring elements;
    producing a microscale structure on the connection portion and the anchoring elements by sandblasting or electromagnetic radiation;
    producing a nanoscale structure over the microscale structure on the connection portion and the anchoring elements.

2. The method of claim 1, wherein the electromagnetic radiation is laser irradiation.

3. The method of claim 2, wherein the laser irradiation is carried out by a short-pulse laser that is moved at a defined feed rate relative to the connection portion.

4. The method of claim 3, wherein the short-pulse laser comprises a femtosecond, picosecond or nanosecond laser having a high pulse repetition frequency.

5. The method of claim 1, wherein the laser for producing the microscale structure and the laser for producing the nanoscale structure are arranged one behind the other such that the microstructure over which the nanostructure is formed is produced in one feed flow path.

6. The method of claim 1, wherein the nanoscale structure is produced over the microscale structure on the connection portion and the anchoring elements by laser irradiation or anodization.

7. The method of claim 6, wherein the laser irradiation is carried out by a short-pulse laser that is moved at a defined feed rate relative to the connection portion.

8. The method of claim 7, wherein the short-pulse laser comprises a femtosecond, picosecond or nanosecond laser having a high pulse repetition frequency.

9. A metal component comprising:
    at least one multi-dimensionally structured connection portion for forming an adhesive bond to fiber-reinforced polymer laminate, the metal component having a milliscale structure formed by anchoring elements which are formed by stamping-and-bending processes, high-speed metal machining, electron beam machining, additive layer production processes, deposit welding or welding on of anchoring elements, which anchoring elements protrude from the connection portion substantially perpendicularly or at a predetermined angle; and
    a microscale structure on the connection portion and the anchoring elements formed by sandblasting or electromagnetic radiation, over which microscale structure an additional nanoscale structure is formed.

10. The metal component of claim 9, wherein connection portions are provided on all sides.

11. The metal component of claim 9, wherein the component is produced from an alloy of titanium, aluminum, steel or magnesium, or from another metal alloy.

12. A method of using a metal component as a z-reinforcement of fiber-reinforced polymer laminates, wherein the metal component is completely surrounded by polymer laminate, the metal component comprising:
    at least one multi-dimensionally structured connection portion for forming an adhesive bond to fiber-reinforced polymer laminate, the metal or ceramic component having a milliscale structure formed by anchoring elements which are formed by stamping-and-bending processes, high-speed metal machining, electron beam machining, additive layer production processes, deposit welding or welding on of anchoring elements, which anchoring elements protrude from the connection portion substantially perpendicularly or at a predetermined angle; and
    a microscale structure on the connection portion and the anchoring elements formed by sandblasting or electromagnetic radiation, over which microscale structure an additional nanoscale structure is formed.

13. The method of claim 12, wherein the metal component is used as a connection element in a co-bonding method.

* * * * *